United States Patent
Biondo

(10) Patent No.: US 9,764,693 B1
(45) Date of Patent: Sep. 19, 2017

(54) ELECTRONIC DEVICE HOLDER PREFERABLY FOR USE IN A MOTOR VEHICLE

(71) Applicant: Barry Biondo, West Palm Beach, FL (US)

(72) Inventor: Barry Biondo, West Palm Beach, FL (US)

( * ) Notice: Subject to any disclaimer, the term of this patent is extended or adjusted under 35 U.S.C. 154(b) by 18 days.

(21) Appl. No.: 15/131,948

(22) Filed: Apr. 18, 2016

Related U.S. Application Data

(60) Provisional application No. 62/286,699, filed on Jan. 25, 2016.

(51) Int. Cl.
*B60R 11/02* (2006.01)
*B60R 11/00* (2006.01)

(52) U.S. Cl.
CPC ... *B60R 11/0241* (2013.01); *B60R 2011/0005* (2013.01); *B60R 2011/0063* (2013.01); *B60R 2011/0071* (2013.01)

(58) Field of Classification Search
CPC ......... B60R 11/0241; B60R 2011/0005; B60R 2011/0063; B60R 2011/0071
See application file for complete search history.

(56) References Cited

U.S. PATENT DOCUMENTS

| | | | |
|---|---|---|---|
| 3,662,982 A * | 5/1972 | Antonius | A47B 31/06 108/45 |
| 5,230,016 A | 7/1993 | Yasuda | |
| 5,529,271 A * | 6/1996 | Dunchock | B60R 11/0241 224/483 |
| D386,766 S | 11/1997 | Johansson | |
| 6,041,717 A * | 3/2000 | Kubat | B60R 11/06 108/44 |
| D437,845 S | 2/2001 | Lee | |
| 7,099,466 B2 | 8/2006 | Walsh | |
| 7,194,087 B2 | 3/2007 | Luginbill | |
| D590,834 S | 4/2009 | Richter | |
| D590,835 S | 4/2009 | Richter | |
| D591,755 S | 5/2009 | Richter | |
| D593,103 S | 5/2009 | Richter | |
| D599,355 S | 9/2009 | Richter | |
| D602,024 S | 10/2009 | Richter | |
| D602,025 S | 10/2009 | Richter | |
| D613,731 S | 4/2010 | Yeo | |
| D616,431 S * | 5/2010 | Hijmans | D14/253 |
| D619,586 S | 7/2010 | Richter | |
| D619,587 S | 7/2010 | Richter | |
| D631,333 S * | 1/2011 | Bauer | D8/367 |
| D637,593 S | 5/2011 | Zanetti | |
| D655,702 S | 3/2012 | Saxton | |
| D668,247 S | 10/2012 | Kim | |

(Continued)

*Primary Examiner* — Corey Skurdal
(74) *Attorney, Agent, or Firm* — Daniel S. Polley, P.A.

(57) ABSTRACT

An electronic device holder for uses such as within a motor vehicle. The holder preferably works with gravity and angular forces using the weight of the electronic device, which can be a smart phone or tablet. Top and bottom contact pads can be provided secure and prevent movement of an inserted electronic device. The twisting action of the electronic device to insert the phone into the holder exerts pressure on the lower part of the holder portion, with enough pressure to stabilize and prevent movement or any significant movement of the electronic device with respect to the holder.

21 Claims, 10 Drawing Sheets

(56) References Cited

U.S. PATENT DOCUMENTS

| | | | | |
|---|---|---|---|---|
| D681,028 | S | 4/2013 | Richter | |
| D681,029 | S | 4/2013 | Richter | |
| 8,490,846 | B1 * | 7/2013 | Wheatley | B60R 11/02 |
| | | | | 224/277 |
| 9,211,001 | B2 * | 12/2015 | Negretti | A47B 23/04 |
| 2002/0100782 | A1 * | 8/2002 | Marvin | B60R 11/0241 |
| | | | | 224/483 |
| 2003/0178539 | A1 * | 9/2003 | Simonian | A63C 11/02 |
| | | | | 248/200 |
| 2007/0062992 | A1 * | 3/2007 | Hepworth | B60R 9/08 |
| | | | | 224/406 |
| 2009/0261219 | A1 * | 10/2009 | Chen | B60R 11/0211 |
| | | | | 248/206.2 |
| 2013/0277529 | A1 * | 10/2013 | Bolliger | F16M 11/10 |
| | | | | 248/676 |
| 2015/0301559 | A1 * | 10/2015 | Wu | F16M 11/041 |
| | | | | 248/229.16 |
| 2016/0091926 | A1 * | 3/2016 | Saxton | G06F 1/1626 |
| | | | | 710/304 |

\* cited by examiner

ELECTRONIC DEVICE HOLDER PREFERABLY FOR USE IN A MOTOR VEHICLE

This application claims the benefit of and priority to U.S. Provisional Patent Application Ser. No. 62/286,699, filed Jan. 25, 2016, which is incorporated by reference in its entirety for all purposes.

FIELD OF THE DISCLOSURE

The disclosure relates generally to electronic device holders, such as, but not limited to, holders for smart phones; and particularly to an electronic device holder preferably for use in a motor vehicle.

BACKGROUND

Most drivers carry cell phones when driving in their vehicle. Often the phone is left on the adjacent passenger seat or in the driver's lap, which results in the phone shifting locations or falling to the vehicle floor or between the vehicle seats based on driving conditions (i.e. sudden stop, bumpy road, speed bump, etc.). Additionally, if the phone rings while the driver is driving, the driver often doesn't know the exact current location of the phone, and can be distracted while driving trying to find his or her phone. The novel electronic device holder disclosed herein is directed to at least reducing, if not overcoming, the above-identified problems.

SUMMARY OF THE DISCLOSURE

An electronic device holder is disclosed for use preferably within a motor vehicle. Though not considered limiting, the types of electronic holders, can include smart phones, cell phones, tablets, iPads, iPods, MP3 players, navigation devices, GPS devices, etc. Though the disclosed holder is preferably used with a motor vehicle, such use is not considered limiting and the holder can be secured to other fixed and mobile objects and items and all uses are considered within the scope of the disclosure.

The holder preferably works with gravity and angular forces using the weight of the electronic device, which in one non-limiting embodiment can be a smart phone. The part of the holder that touches the screen of the electronic device can be provided with a pad, cushioning pad, sticky and/or suction pad to prevent movement of the electronic device. The twisting action of the smart phone to insert the phone into the holder exerts pressure on the lower part of the holder, which preferably compresses a similar type padding, sticky object and/or suction pad (i.e. preferably made of silicone) with enough pressure to stabilize and prevent movement or any significant movement of the electronic device with respect to the holder in bumpy conditions.

In one embodiment, adhesive or sticky tape is applied to a vertically oriented back surface of an attachment/mounting portion of the holder which allows the holder to be secured to an object such as, but not limited to, the dash area of a motor vehicle. In one non-limiting embodiment, the mounting portion can be separate from the holder body member and the two parts are permanently secured to each other. Alternatively, the mounting portion can be monolithically formed and/or permanently secured to a holding portion of the disclosed electronic device holder. When the mounting portion is secured in the desired vertical orientation, it automatically aligns the holding portion in proper position for receiving the electronic device and maintaining/holding/suspending the electronic device in proper position for easy access and viewing and such that the user knows exactly where the electronic device is located within the motor vehicle.

Though not preferred but considered within the scope of the disclosure, one portion of a hook and loop member can be permanently secured to an area of the dashboard and the mating second portion of the hook and loop member can be secured to the back surface of the mounting portion. Therefore, when in use the electronic device holder can be secured to the dash in proper position by mating the two hook and loop fastening members. In this embodiment, when the device holder is not needed it can be detached/unmating fastening members and the holder stored for later usage (e.g. in the glove compartment, center console, side door pocket, etc.).

Another novel aspect of the holder is directed to an alternative mechanism for securing/mounting the holder in a vehicle. In this alternative mounting embodiment, a vertical gap in the dash area is used. For any dashboard gap, a business card extension extending from the back of the holder can be inserted into such gap for maintaining the holder in position with respect to the dashboard. Once the top of the base is secured to the dashboard, the angular force from the weight of the phone, puts pressure on the base pushing it towards the edge of the dash. In addition or alternatively, a sticky removable silicone tape can also be provided on the inside of the base for adhering the holder to the dashboard.

The base of the holder can also be provided with a relatively thin tab preferably with a small tension wire attached. Once the tab is inserted in a slot or gap between two panels on the dash, the thread end when tightened causes the plastic tab to fold up like an accordion such that it securely wedges in the void between two panels in the dash for maintaining the holder in position.

As an alternative securement embodiment, a two part mounting base can be provided, where a first part remains secured to the vehicle dash and the second part is permanently secured to the electronic device holder and removably secured to the first part when using the holder inside the vehicle. In this alternative securement embodiment, the first part can be considered a sub base with a locking tab that is secured to the dashboard and the second part has a receiving slot for receiving the locking tab. Though not limiting, the sub base can be "L" shaped such that it can be mounted to any corner portion of an automobiles' console or other corner portion of an item (e.g. computer monitor, headboard of a bed, end table next to a bed, etc.) and provide for a stable securement. The extra side portion (not locking tab side) can also be eliminated or broken off, in order to permit the sub base to be mounted to any flat surface of the automobile or other object.

Thus, with the novel disclosed holder secured to the motor vehicle and suspending an electronic device, the driver of the vehicle knows exactly where his or her electronic device is located and doesn't have to be distracted while driving searching for the electronic device (e.g. when an incoming phone call is received, etc.). The disclosed embodiment provides for a hands free universal cell phone/tablet/electronic device holder and mount and can be used for various sized mobile electronic devices. The weight of the electronic device is used for the gripping to maintain the electronic in position.

DETAILED DESCRIPTION

Figure 1:
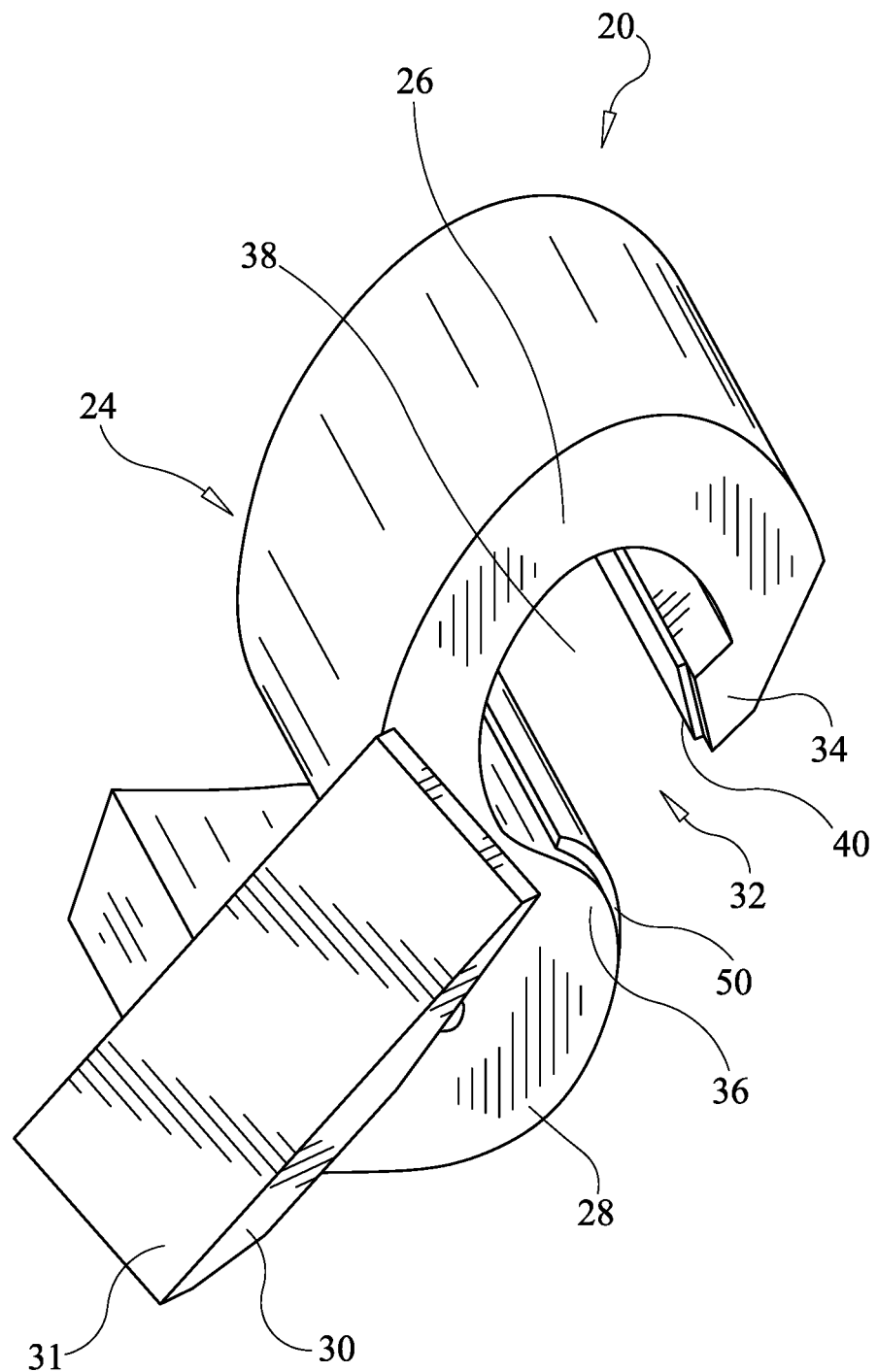
FIG. 1 illustrates a first perspective view of a novel electronic device holder in accordance with a first embodiment of the disclosure.
Figure 2:
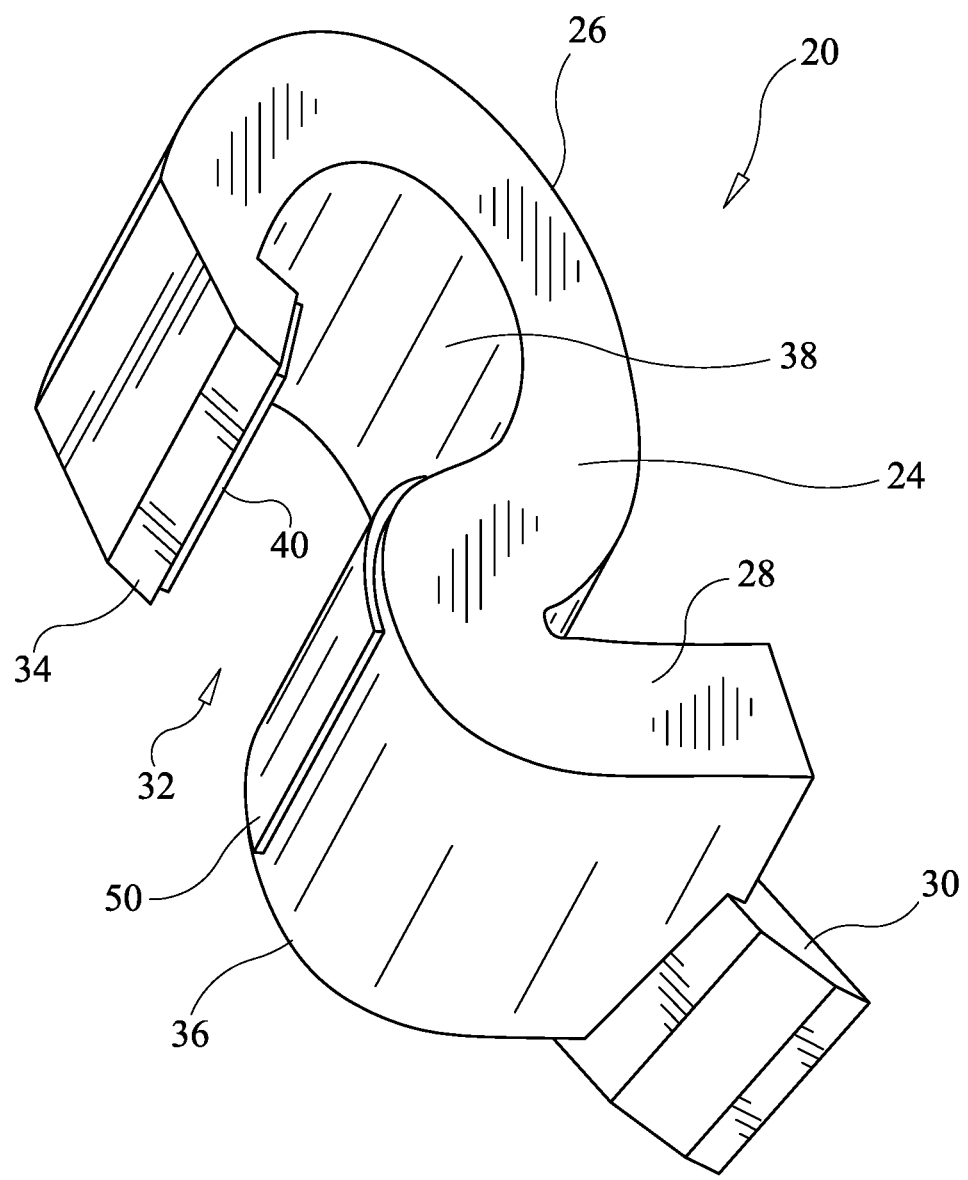
FIG. 2 illustrates a second perspective view of the novel electronic device holder of FIG. 1.
Figure 3:
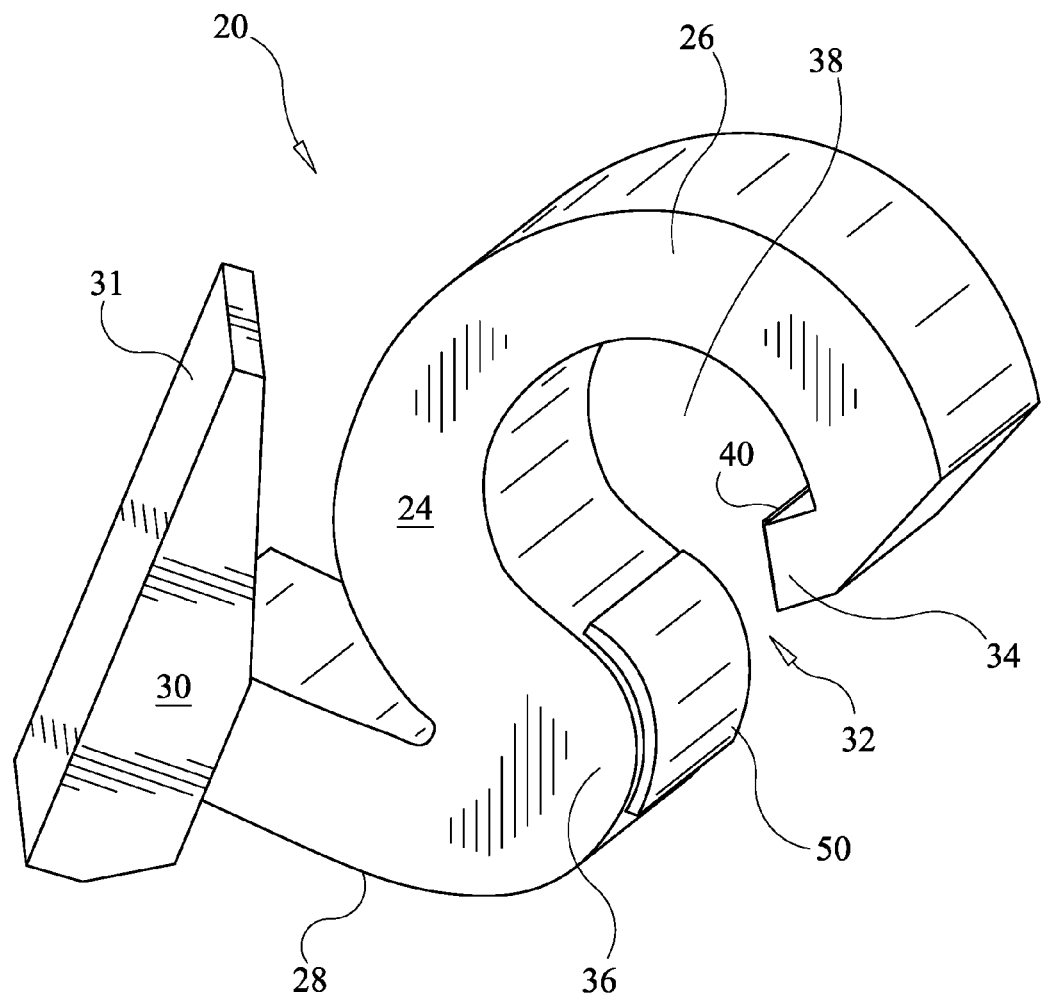
FIG. 3 illustrates a third perspective view of the novel electronic device holder of FIG. 1.
Figure 4:
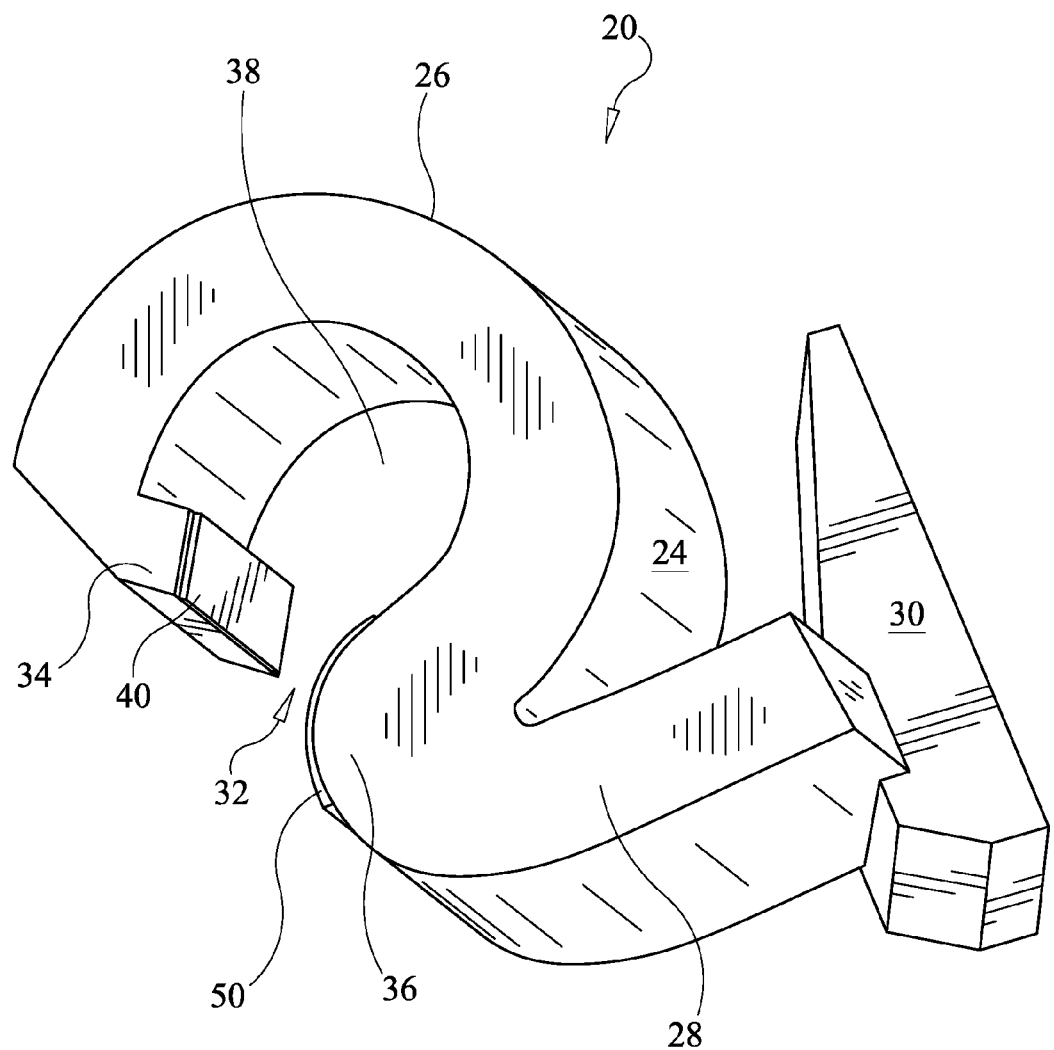
FIG. 4 illustrates a fourth perspective view of the novel electronic device holder of FIG. 1.

The above summary is incorporated by reference into this detailed description. The following formulas are relevant to the above and below disclosed electronic device holder embodiments: gravity (32 ft/sec)×mass=force; force+mass× acceleration; and pressure=force/area.

FIGS. 1-4 illustrate a first embodiment for the electronic device holder which is generally designated as holder 20. Holder 20 can include a body member 24 having an electronic device holding portion 26 and an optional remaining portion 28, along with a mounting base 30. When initially constructing holder 20, mounting base 30 and body member 24 can be separate components, which in one non-limiting embodiment are permanently secured to each other. Alternatively, holder 20 can be monolithically formed as a one piece member (mounting base 30 and body member 24) or body member 24 can be removably secured to mounting base 30, which will be discussed in more detail below in connection with the alternative mounting embodiment shown in FIGS. 8-10.

Regardless of the mounting mechanism used, holding portion 26 preferably contains a gap or opening 32 having a top end 34 and a bottom end 36. Gap 32 is in communication with an electronic device receiving portion 38 defined by holding portion 26. Preferably, a top contact pad 40 is secured at top end 34 and a bottom contact pad 50 is secured at bottom end 36.

In one non-limiting embodiment body member 24 can be substantially "S" shaped with the upper area constituting the holding portion 26 and the lower area being remaining portion 28. Where remaining portion 28 is provided based on the shape of body member 24, preferably remaining portion 28 is the part of body member that comes into contact with or is secured to mounting base 30. Other non-limiting shapes for body member 24 that can be uses which will provide the position relationship between top contact pad 40 and bottom contact pad 50 are substantially "C", substantially "U", substantially "V" and substantially "G" shaped holding portions, though other letter and non-letter shapes that also maintain this relationship can also be used and are considered to be within the scope of the disclosure.

As mentioned above, body member 24 of holder 20 can be provided with relatively soft pads 40 and 50 located at the top and bottom surfaces of gap 32 where the electronic device is inserted. Though not limiting, preferably pads 40 and 50 can be made from silicone. With an electronic device, such as, but not limited to, a smart phone or tablet, inserted, the force is maximized preferably using a small surface contact area. As pressure=force/area, a relatively small contact area (small portion of the screen on the top side) exerts enough pressure on the phone, with the phone (electronic device) using its own weight to hold itself in place with respect to its inserted position within receiving area 38 of holding portion 26. In a preferred embodiment, a maximum angular force for the electronic device to use its own phone mass can be approximately a 45 degree angle. Thus, in a preferred embodiment, the phone can be at a 45 degree or substantially 45 degree angle when locked or held into place within receiving 38 and by holding portion 26 after being inserted through front gap 32. When the electronic device is inserted, the angular force can be developed on a pivot point along bottom pad 50.

Thus, holder 20 preferably works with gravity and angular forces using the weight of the electronic device, which in one non-limiting embodiment can be a smart phone or tablet. The part of holder 20 that touches the screen of the electronic device can be provided with top pad 40 which can be a cushioning pad, sticky and/or suction pad to prevent movement of the electronic device. The twisting action of the smart phone to insert the phone into the holder exerts pressure on the lower part of the holder, which preferably compresses a similar type padding (bottom pad 50), sticky object and/or suction pad (i.e. preferably made of silicone) with enough pressure to stabilize and prevent movement or any significant movement of the electronic device with respect to the holder in bumpy conditions.

Figure 5:
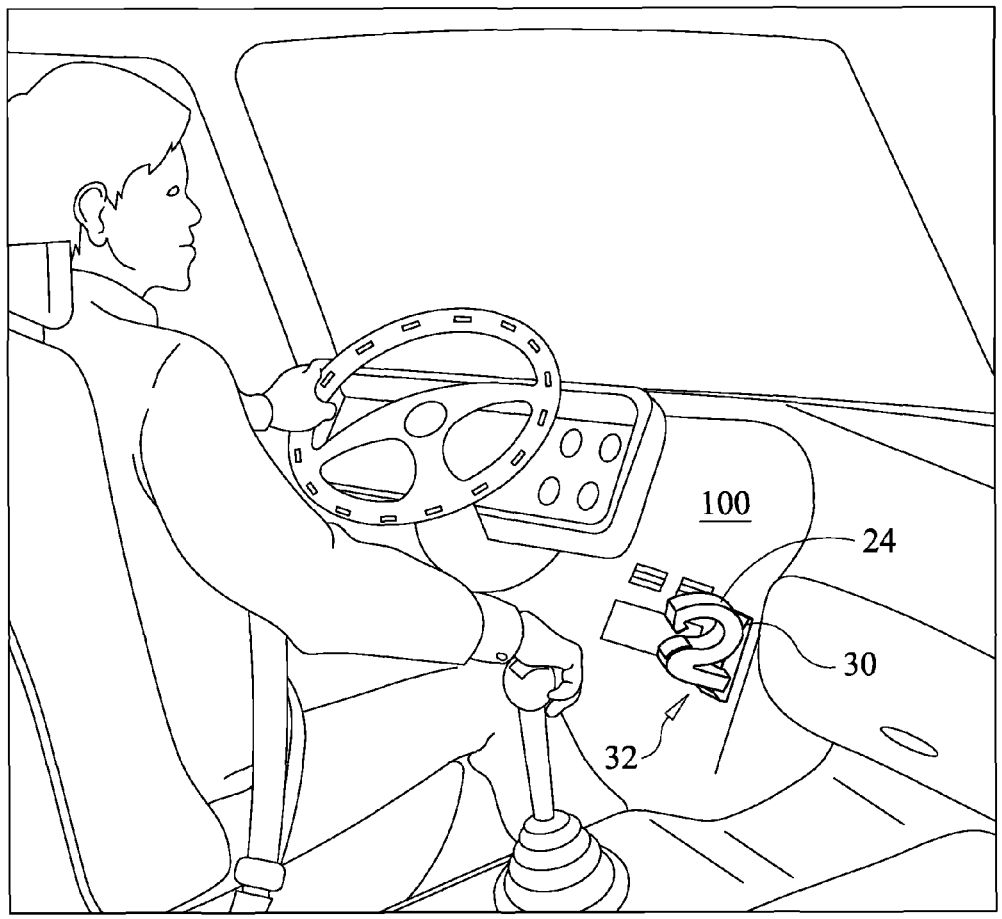
FIG. 5 illustrates a perspective view of the inside of a vehicle showing the novel electronic device holder secured to a portion of the dash area within the vehicle.
Figure 6:
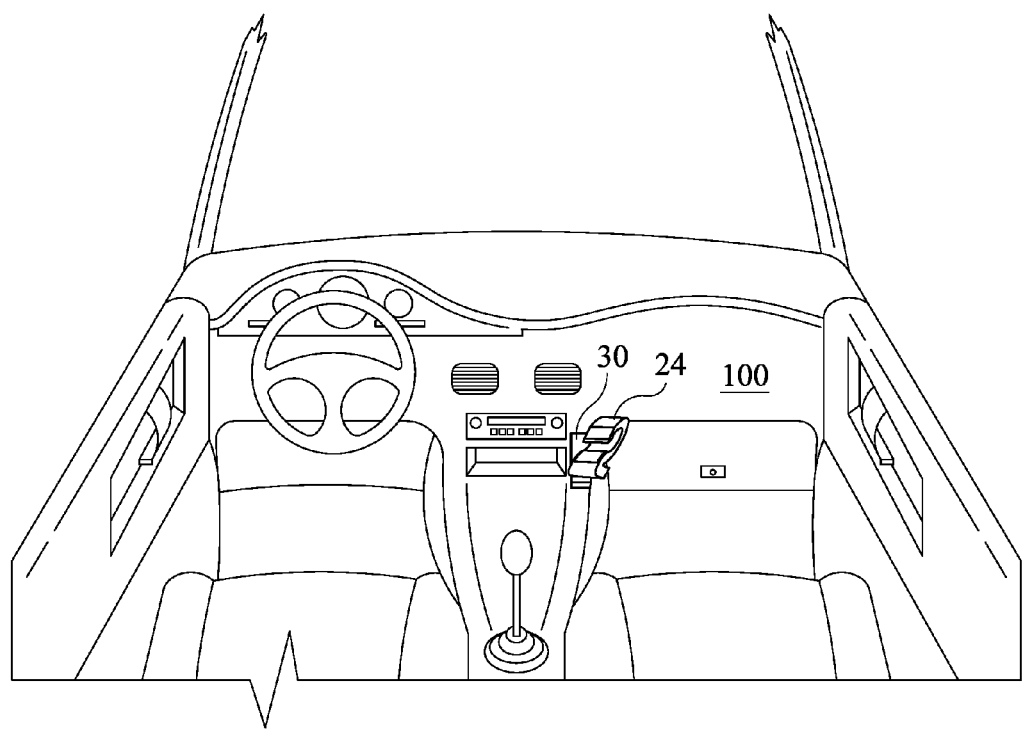
FIG. 6 illustrates another perspective view of the inside of a vehicle showing the novel electronic device holder secured to a portion of the dash area within the vehicle.
Figure 7:
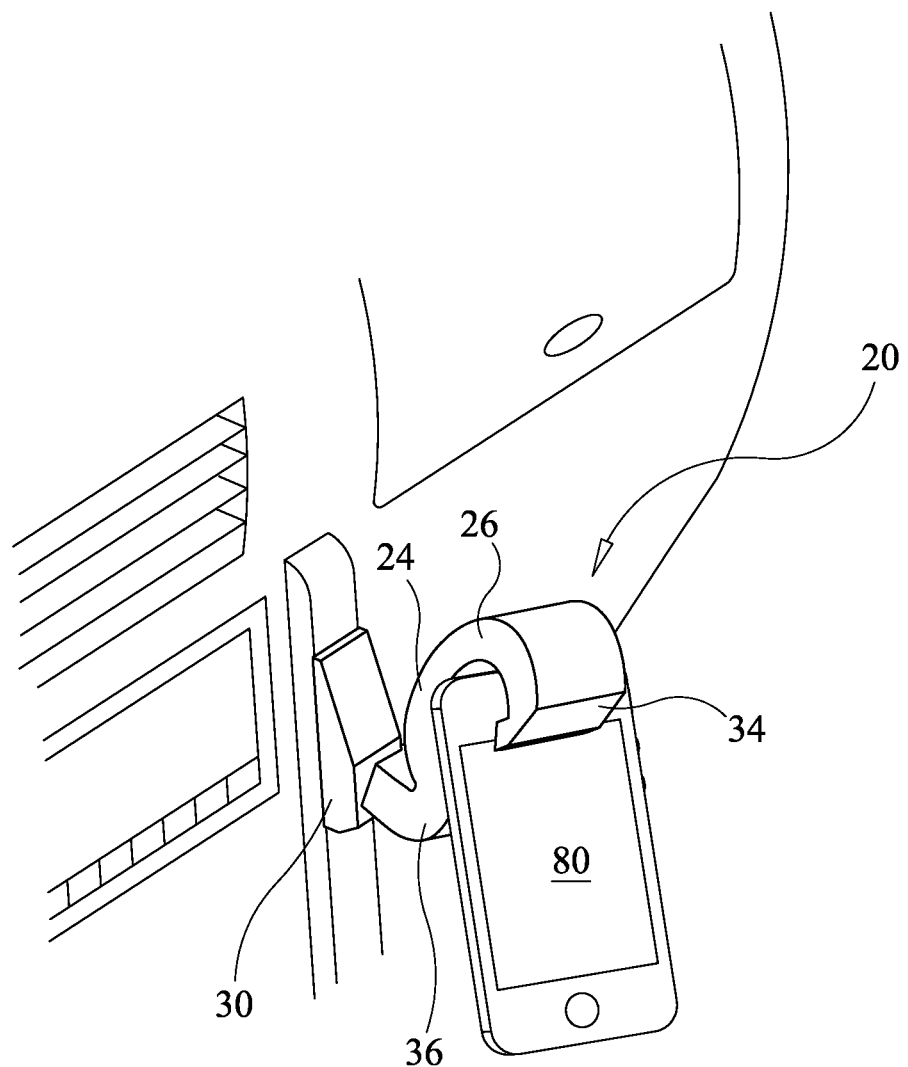
FIG. 7 is closer perspective view of the novel electronic device holder secured to the dash area and having a smart phone/electronic device inserted and being held in place by the holder.

FIGS. 5 through 7 show holder 20 installed within the interior area of a motor vehicle and specifically to a portion of the dashboard 100. FIG. 7 illustrates a closer view with a smart phone 80 inserted into holder 20 and being held in place by holder 20 through contacts with upper and bottom pads 40 and 50, respectively. In use, the electronic device can be inserted into the unrestricted front opening or gap 32 and received within receiving area 38. As the inserter/user releases the electronic device the electronic device rotates using its own weight (i.e. the weight of phone 80), which transfers the energy/pressure to the top and bottom pads 40 and 50, respectively, which can be preferably constructed from silicone, though such material is not considered limiting. In one non-limiting embodiment, pads 40 and 50 preferably contain micro suction cups, with top pad 40 griping a small portion of the electronic device screen and/or upper surface when the electronic device is inserted with the screen facing upwards. Though it is preferred that both top and bottom pads 40 and 50 be provided, it is also within the scope of the disclosure, that only a bottom pad 50 or a top pad 40 is provided and the electronic device directly contacts a portion of holding portion 26 where the pad would normally be positioned. The preferred silicon pads 40 and 50 can be molded into an area of holding portion 26 of body member 24 of electronic device holder 20. In one non-limiting embodiment, the contact surface of upper pad 40 can be preferably planar corresponding to the surface of upper end 34 that it is secured to and the contact surface of bottom pad 50 can be curved or slightly curved to correspond to the surface of bottom end that it is secured to.

Once the electronic device is inserted within receiving area 38 of a holder 20 that is secured to a dashboard 100, the position of the electronic device remains fixed within the vehicle (or other location where the holder is attached to a non-vehicle dashboard object), such that user knows exactly where the electronic device is at all times. Once holder 20 is secured, in use holder 20 preferably has no moving parts and requires no adjustments, including no adjustments to the to the electronic device holding portion 26. The electronic device is merely inserted within opening/gap 32 and the electronic device's own weight causes it to rotate and come into contact with the upper and lower pads 40 and 50 which then securely hold and maintain the electronic device in place, with a portion of the electronic device disposed within gap 32 and receiving area 38 and a remaining portion of the electronic device extending out of holder 20 and preferably positioned where the user can operate the electronic device (i.e. which operation is recommended only to occur while the vehicle is parked or otherwise not moving for safety reasons).

Preferably, though not limiting, adhesive tape manufactured by 3M under the VHB trademark can be used for securing the holder to the surface, such as, but not limited to, vehicle dashboard 100. The adhesive tape or other adhesive member or component can be provided on a contact surface 31 of mounting base 30.

For a removable electronic device holder, which includes a sub base that permanently remains attached, in lieu or in addition to adhesive tape or other adhesives, the surface having the locking tab can also be provided with one more apertures, to allow the sub base to be screwed into any fixed surfaces with one or more screws. The two part mounting base embodiment is shown in FIG. 8-10 and discussed in more detail below.

Figure 8:
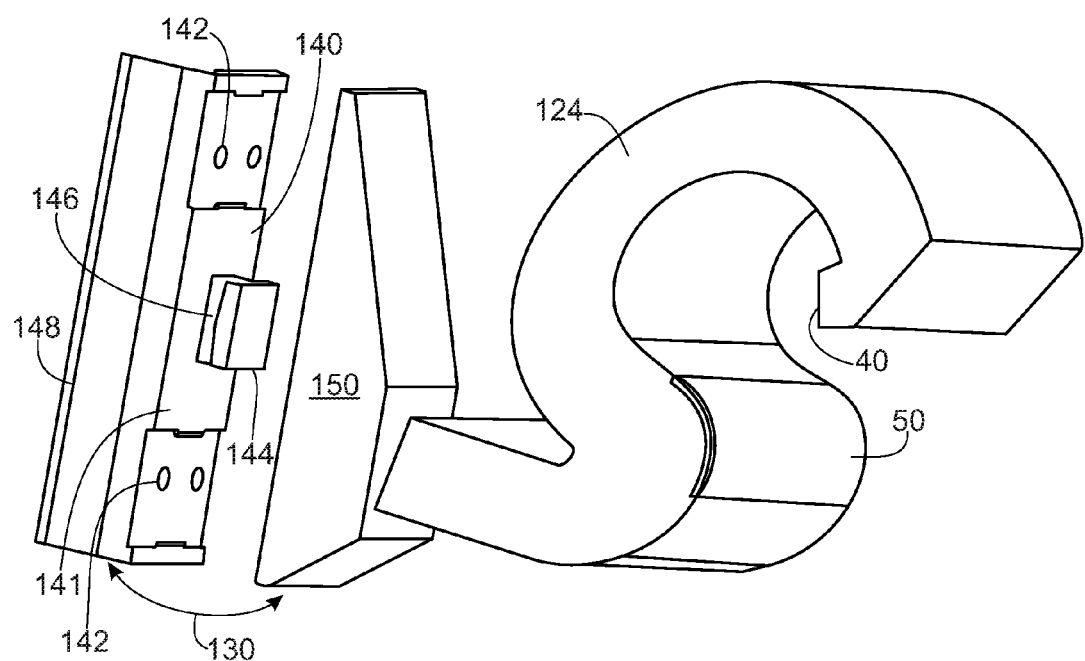
FIG. 8 illustrates a first perspective exploded view of a novel electronic device holder in accordance with a second embodiment of the disclosure.
Figure 9:
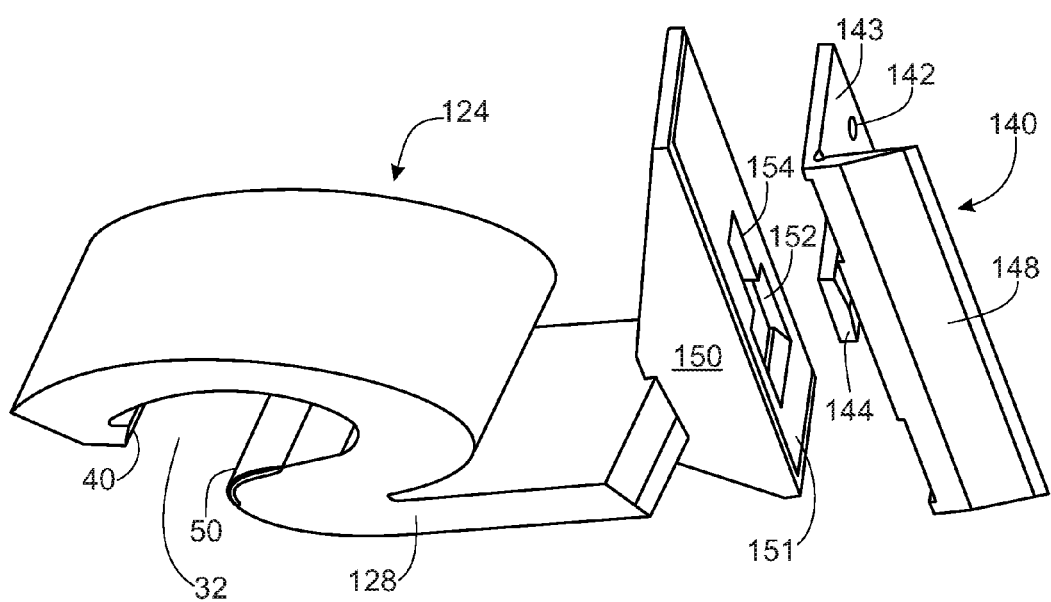
FIG. 9 illustrates a second perspective view of the novel electronic device holder of FIG. 7.
Figure 10:
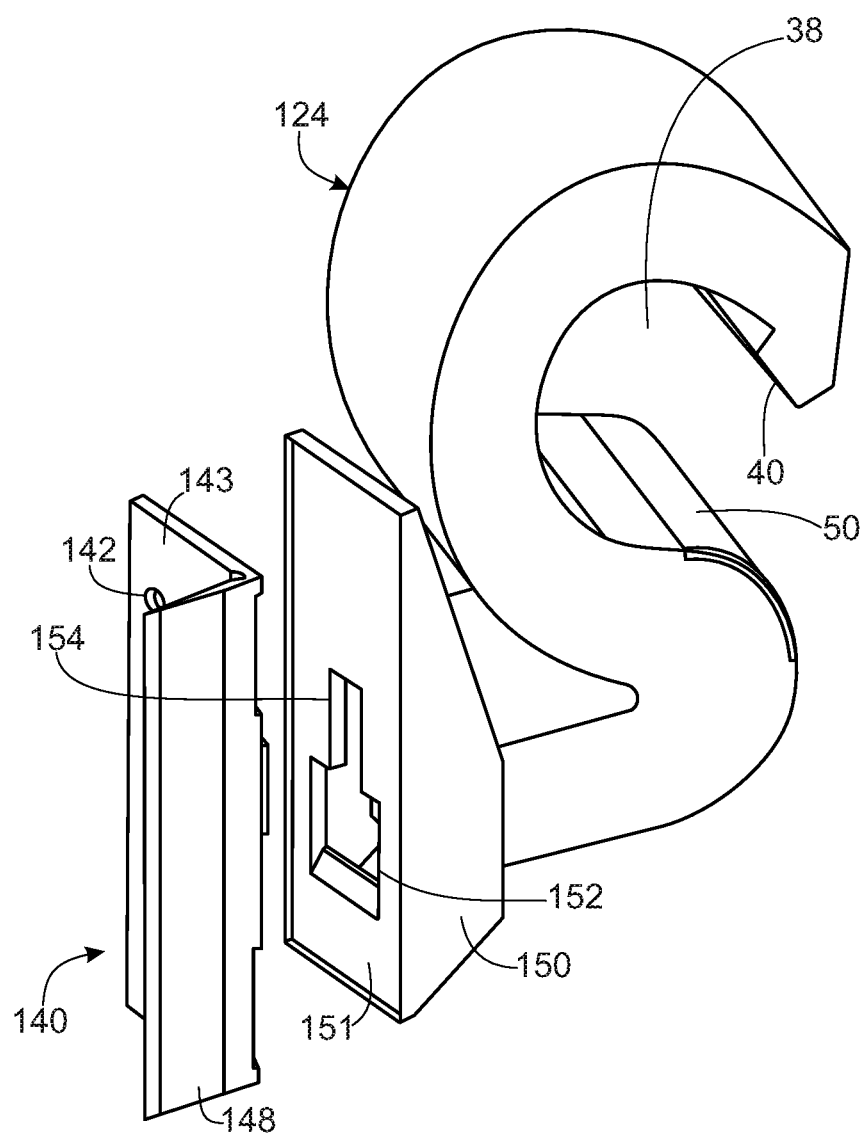
FIG. 10 illustrates a third perspective view of the novel electronic device holder of FIG. 7.

FIGS. 8-10 illustrate the above-identified alternative two piece mounting base generally designated as mounting base 130. A first part 140 can remain secured to vehicle dash 80 or other intended object and the second part 150 can be permanently secured to the electronic device holder body member 124. Second part 150 can be removably secured to first part 140 when using the holder inside the vehicle or other intended use. In this alternative securement embodiment, first part 140 can be considered a sub base with a locking tab 144 that is secured to dashboard 100 and second part 150 has a receiving slot 152 or receiving locking tab 144. As shown, but not considered limiting, an inner portion 146 can be thinner than the outer portion of locking tab 144 and a top portion 154 can be narrower than the lower portion of receiving slot 152. In this configuration, to secure first part 140 to second part 150, locking tab 144 is inserted into the wider lower portion of receiving slot 152, second part 150 with body member 124 attached thereto, is then moved downward such that thinner locking portion 146 travels into narrower slot 154. The top edge of the slot prevents the second part from moving downward and as the wider outer locking tap 144 is positioned within second part 150 and behind narrower slot 154, second part 150 cannot be pulled forward and is maintained in removably secured position with respect to first part 140.

Though not limiting, the sub base can be "L" shaped such that it can be mounted to any corner portion of an automobiles' console or other corner portion of an item (e.g. computer monitor, headboard of a bed, end table next to a bed, etc.) and provide for a stable securement. The extra side portion (not locking tab side) can also be eliminated or broken off, in order to permit the sub base to be mounted to any flat surface of the automobile or other object.

Using the two part base of FIGS. 8-10 allows for fit applications in the future for different cars. Also many dashes have a slight curve to them. By having the base separate into the two parts, the first part can be flexed and contour more easily to the shape of the dashboard. When using an L-shaped base, the base can be attached to vehicle/dashboard with adhesive strips on each surface which can provide optimal stability when a corner of the dash is available. Thus, the base can be mounted without screws, and the apertures shown are not required and can be eliminated. Thus, holder/mount becomes more universal to be able to be secured to various shaped surfaces.

Where it is intended to secure the base with screws, pre-existing apertures 142 can be provided on the surface of first part 140 and at least one surface in configurations where first part 140 base is L shaped. As best seen in FIG. 8, one or more indentations/cavities can also be provided in first part 140 base to allow the use of metal bands that will strap first part to the intended surface/object allowing installation without adhesive.

In another alternative attachment embodiment, the mounting base can use a small gap between the dashboard panels for maintaining the holder in place and/or can be secured by adhesive to a desired portion of the dashboard. For securing the older, the angular force principles are again employed by preferably securing the top of the base with a slim tab. The tab can be preferably made of spring steel and can have gripping tabs that expand once or as they are inserted into the small gap between the dashboard panels. Preferably, only a relatively slight can be necessary as by securing the top, the weight of the phone can put an angular force on the lower portion of the base and the adhesive strip that is also preferably provided.

Though not considered limiting, electronic device holding portion 26 can be positioned at an angle with respect to the vertical position of mounting base 30. This relationship is best seen in FIG. 6.

Various materials can be used for the holder and all are considered within the scope of the disclosure.

The non-vehicle and/or non-electronic device uses for the holder are also many and can include, without limitation, for holding pots and plates in a kitchen, etc.

Preferably, though not limiting, when securing by adhesive, the base mount can be installed by cleaning the securement area with alcohol and letting it dry. Once dry, the adhesive backing can be peeled off or otherwise removed and even pressure is preferably applied on the base for a period of time, such as, but not limited to, about 30 seconds Prior to use, it is preferred that the bond be allowed to cure for at least an hour, and preferably about 24 hours, such that bond will be at or near its maximum.

Other sticky securement materials can also be used, with the preferred material such as, but not limited to the 3M adhesive tape, being selected to prevent or significantly reduce damage to the vinyl/dashboard if the user decides to remove first part 140 or holder 20 from its securement position.

The contact pads can be secured to body member 24 by any conventional means and the silicone can also be injected, to create the pads. Channels, notches, grooves, etc. as needed can be provided in body member 24

All locations, sizes, shapes, measurements, amounts, angles, securement mechanisms, component or part locations, configurations, weights, dimensions, values, percentages, materials, orientations, etc. discussed above or shown in the drawings are merely by way of example and are not considered limiting and other locations, sizes, shapes, measurements, amounts, angles, securement mechanisms, component or part locations, configurations, temperatures, weights, dimensions, values, percentages, materials, orientations etc. can be chosen and used and all are considered within the scope of the invention.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the electronic device holder has been described and disclosed in certain terms and has disclosed certain embodiments or modifications, persons skilled in the art who have acquainted themselves with this disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A holder for securing and maintaining an item in place using the weight of the item, said holder secured to an object, said holder comprising:
    a single body member having a holding portion, the holding portion comprising at a top end and a bottom area and defining a gap between the top end and the bottom area, the holding portion also defining a receiving area in communication with the gap; and
    a mounting base secured to the body member;
    wherein in use the mounting base is secured to the object and the item is inserted within the gap and at least a portion of the receiving area and the body member is aligned with the mounting base such that the weight of the item causes the item to pivot along the bottom area and a first portion of the item comes into contact with the top end and a second portion of the item comes into contact with the bottom area at the same time such that the item is maintained in place by the holding portion of the single body member while another portion of the item hangs below the bottom area.

2. The holder for securing and maintaining an item of claim 1 further comprising a first contact pad secured to the top end of the holding portion and a second contact pad secured to the bottom area of the holding portion, wherein in use the first contact pad contacts an upper surface of the item and the second contact pad contact a lower surface of the item.

3. The holder for securing and maintaining an item of claim 1 further comprising an adhesive member disposed on a back surface of the mounting base for securing the mounting to the object.

4. The holder for securing and maintaining an item of claim 1 wherein the body member is substantially "S" shaped with the holding portion being an upper portion of the "S" shaped body member and a lower portion of the "S" shaped body member being secured to the base member; wherein an upper end of the substantially "S" shaped body member extending outward in a first direction and a lower end of the substantially "S" shaped body member extending outward in a second direction that is substantially opposite to the first direction; wherein the mounting base is secured to the body member at the lower end of the substantially "S" shaped body member.

5. The holder for securing and maintaining an item of claim 1 wherein the body member is disposed at an angle with respect to the mounting base when the mounting base is secured vertically to the object.

6. The holder for securing and maintaining an item of claim 1 wherein the body member protrudes outward or forward from the mounting base when the mounting base is secured vertically to the object.

7. The holder for securing and maintaining an item of claim 1 wherein the mounting base comprises a first member permanently secured to the object and a second member permanently secured to the body member, wherein the first member is removably secured to the second member.

8. The holder for securing and maintain an item of claim 1 wherein the top end extends downwards towards the bottom area such that a cross-sectional opening of the gap is smaller in size as compared to a cross sectional opening of the receiving area.

9. A holder for securing and maintaining an item in place using the weight of the item, said holder secured to an object, said holder comprising:
    a body member having a holding portion, the holding portion comprising a top end and a bottom area and defining a gap between the top end and the bottom area, the holding portion also defining a receiving area in communication with the gap; and
    a mounting base secured to the body member;
    wherein in use the mounting base is secured to the object and the item is inserted within the gap and at least a portion of the receiving area and the body member is aligned with the mounting base such that the weight of the item causes the item to pivot along the bottom area and come into contact with both the top end and the bottom area at the same time such that the item is maintained in place by the holding portion;
    a first contact pad secured to the top end of the holding portion; and
    a second contact pad secured to the bottom area of the holding portion, wherein in use the first contact pad contacts an upper surface of the item and the second contact pad contact a lower surface of the item;
    wherein the first contact pad and the second contact pad are constructed from silicone and contain micro suction cups for helping to maintain the position of the item with respect to the holding portion.

10. A holder for securing and maintaining an item in place using the weight of the item, said holder secured to an object, said holder comprising:
    a body member having a holding portion, the holding portion comprising a top end and a bottom area and defining a gap between the top end and the bottom area, the holding portion also defining a receiving area in communication with the gap; and a mounting base secured to the body member;

wherein in use the mounting base is secured to the object and the item is inserted within the gap and at least a portion of the receiving area and the body member is aligned with the mounting base such that the weight of the item causes the item to pivot along the bottom area and come into contact with both the top end and the bottom area at the same time such that the item is maintained in place by the holding portion;

wherein the mounting base comprises a first member permanently secured to the object and a second member permanently secured to the body member, wherein the first member is removably secured to the second member;

wherein the first member of the mounting base is substantially "L" shaped and is provided with adhesive on its inner surfaces for securing the first member to the object.

11. A holder for securing and maintaining an electronic device to an object using the weight of the electronic device, said holder secured to an object, said holder comprising:

a single one-piece body member having a holding portion and a remaining portion, the holding portion comprising a top end and a bottom area and defining a gap between the top end and the bottom area, the holding portion also defining a receiving area in communication with the gap, the top end defining an upper contact point for the holding portion and the bottom area having an outer end portion defining a lower contact point for the holding portion;

a mounting base secured to the remaining portion of the body member;

wherein in use the mounting base is secured to the object and the electronic device is inserted screen up within the gap and at least a portion of the receiving area and the body member is aligned with the mounting base such that the weight of the electronic device causes the electronic device to pivot along the lower contact point at the bottom area and come into contact with both the upper contact point at the top end while remaining in contact with the lower contact point such that the electronic device is maintained in place by the holding portion and the electronic device remains in contact with the upper contact point and the lower contact point at all times while being held in place by the holding portion of a single one-piece body member.

12. The holder for securing and maintaining an electronic device of claim 11 further comprising a first contact pad secured to the top end of the holding portion at the upper contact point and a second contact pad secured to the bottom area at the lower contact point of the holding portion; wherein the first contact pad and the second contact pad are constructed from silicone and contain micro suction cups for helping to maintain the position of the electronic device with respect to the holding portion.

13. The holder for securing and maintaining an electronic device of claim 11 further comprising an adhesive member disposed on a back surface of the mounting base for securing the mounting to the object.

14. The holder for securing and maintaining an item of claim 13 wherein the adhesive is adhesive tape.

15. The holder for securing and maintaining an electronic device of claim 11 wherein the body member is substantially "S" shaped with the holding portion being an upper portion of the "S" shaped body member and the remaining portion being a lower portion of the "S" shaped body member and with the lower contact point being curved in shape.

16. The holder for securing and maintaining an electronic device of claim 11 where the body member is disposed at an angle with respect to the mounting base when the mounting base is secured vertically to the object.

17. The holder for securing and maintaining an electronic device of claim 11 wherein the body member protrudes outward or forward from the mounting base when the mounting base is secured vertically to the object.

18. The holder for securing and maintaining an item of claim 11 wherein the mounting base comprises a first member permanently secured to the object and a second member permanently secured to the body member, wherein the first member is removably secured to the second member.

19. The holder for securing and maintaining an item of claim 18 wherein the first member of the mounting base is substantially "L" shaped and is provided with adhesive on its inner surfaces for securing the first member to the object.

20. The holder for securing and maintaining an item of claim 11 wherein the object is a motor vehicle dashboard, a computer monitor or a headboard for a bed and the mounting base is adapted for securement to the motor vehicle dashboard, a computer monitor or a headboard.

21. A holder for securing and maintaining an electronic device to a dashboard of a vehicle using the weight of the electronic device, said holder secured to the dashboard, said holder comprising:

a one-piece substantially "S" shaped body member having a holding portion an a remaining portion, the holding portion being an upper portion of the "S" shaped body member and the remaining portion being a lower portion of the "S" shaped body member, the holding portion terminating at a top end and a bottom area and defining a gap between the top end and the bottom area, the holding portion also defining a receiving area in communication with the gap;

a first silicone contact pad secured to the top end of the holding portion, said first silicone contact pad having a plurality of micro suction cups;

a second silicone contact pad secured to the bottom area of the holding portion, said second silicone contact pad having a plurality of micro suction cups, a mounting base secured to the remaining portion of the body member; and an adhesive tape disposed on a back surface of the mounting base for securing the mounting to the object;

wherein in use the mounting base is secured to the dashboard and the electronic device is inserted screen up within the gap and at least a portion of the receiving area and the body member is aligned with the mounting base such that the weight of the electronic device causes the electronic device to pivot along the second contact pad secured at the bottom area and come into contact with both the first contact pad secured to the top end and the second contact pad at the same time such that the electronic device is maintained in place by the holding portion;

wherein the body member is disposed at an angle and protrudes outward or forward with respect to the mounting base when the mounting base is secured vertically to the dashboard.

* * * * *